United States Patent [19]
Newbould

[11] 3,901,845
[45] Aug. 26, 1975

[54] FILLED AND REINFORCED POLYAMIDE MOLDING COMPOSITIONS

[75] Inventor: John Newbould, Sterling Heights, Mich.

[73] Assignee: General Motors Corporation, Detroit, Mich.

[22] Filed: Apr. 1, 1974

[21] Appl. No.: 456,664

[52] U.S. Cl.......... 260/37 N; 106/308 Q; 106/308 N
[51] Int. Cl.² .......................................... C08K 9/04
[58] Field of Search............ 260/42.14, 42.16, 37 N; 106/308 N, 308 Q

[56] References Cited
UNITED STATES PATENTS

| | | | |
|---|---|---|---|
| 2,657,149 | 10/1953 | Iler | 106/308 Q |
| 2,739,075 | 3/1956 | Iler | 106/308 N |
| 2,739,076 | 3/1956 | Iler | 106/308 Q |
| 2,739,078 | 3/1956 | Broge | 106/308 Q |
| 2,874,139 | 2/1959 | Symons | 260/37 N |
| 3,386,943 | 6/1968 | Hedrick | 260/37 N |
| 3,419,517 | 12/1968 | Hedrick | 260/37 N |
| 3,450,662 | 6/1969 | Tierney | 260/37 N |

*Primary Examiner*—Joseph L. Schofer
*Assistant Examiner*—P. R. Michl
*Attorney, Agent, or Firm*—George A. Grove

[57] ABSTRACT

In the subject filled and reinforced polyamide (e.g., nylon 6 or nylon 66) compositions, the mineral filler is chemically coupled to the polymer matrix by a compound having the following structural formula:

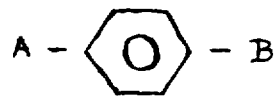

wherein the A segment is either a carboxyl (—COOH) or a methylene hydroxyl (—CH₂OH) functionality, and the B segment is either an amine (—NH₂) or a hydroxyl (—OH) functionality. The B segment would preferably be in either an ortho or para position to the A segment.

4 Claims, No Drawings

FILLED AND REINFORCED POLYAMIDE MOLDING COMPOSITIONS

FIELD OF THE INVENTION

This invention relates to a filled and reinforced polyamide composition and, more specifically, to the use of novel aromatic coupling agents as the means to chemically couple the mineral filler to the polyamide matrix.

BACKGROUND OF THE INVENTION

Many of the physical properties of polyamide resins can be improved by the incorporation of suitable reinforcing fillers. A key to developing such a product is to effectively link the filler to the polyamide matrix. Without this link or coupling, the addition of a filler seriously reduces the tensile strength of the resin at relatively low concentrations.

An effective coupling agent is one that will chemically react with both the polyamide and with the inorganic fillers. Therefore, it must possess both a chemical moiety which is compatible with and able to interact with the polymer, and an additional and separate chemical moiety which is compatible with and able to react with a functionality on the surface of the filler.

The organosilane compounds have been widely used as coupling agents in many polymer systems. Reinforced polyamide compositions which employ the organosilane coupling agents are described in U.S. Pat. No. 3,328,339 issued to Tierney and U.S. Pat. No. 3,419,517 issued to Hedrick. Because of the rather complicated chemical structure of the disclosed coupling agents and of organosilanes, in general, they are relatively expensive compounds. In addition to their cost there are several other disadvantages in using the organosilane coupling agents. For example, the aminosilanes present the handling problems associated with relatively nocuous, volatile liquids, and the manufacturers specifically warn the user about their irritating properties.

OBJECTS OF THE INVENTION

It is an object of this invention to provide a filled and reinforced polyamide composition wherein the reinforcing filler is coupled to the polyamide matrix by a compound which has the following structural formula:

wherein the A segment is either a carboxyl (—COOH) or a methylene hydroxyl (—CH$_2$OH) functionality, and the B segment is either an amine (—NH$_2$) or a hydroxyl (—OH) functionality. The B segment would preferably be in either an ortho or para position to the A segment.

It is a further object of this invention to provide a method of preparing the aforementioned filled and reinforced polyamide thermoplastic molding composition.

SUMMARY OF THE INVENTION

In accordance with a preferred embodiment of my invention, these and other objects are accomplished by first providing a mineral filler which has a suitable predetermined particle size and shape and which has reactive hydroxyl functionalities on its surface. For example, a particulate silica having an average particle size in the range of 2 to 10 microns is suitable.

The filler particles are pretreated with a suitable coupling compound by thoroughly blending and uniformly coating them with from 0.3% to 2% by weight, based on the filler, of a compound which has the following structural formula:

wherein the A segment is either a carboxyl (—COOH) or a methylene hydroxyl (—CH$_2$OH) functionality, and the B segment is either an amine (—NH$_2$) or a hydroxyl (—OH) functionality. The B segment would preferably be in either an ortho or para position to the A segment.

Specific examples of such coupling compounds include p-hydroxylbenzyl alcohol, p-aminobenzyl alcohol, p-hydroxybenzoic acid and p-aminobenzoic acid.

To insure adequate wetting and the formation of a uniform coating of the coupling agent on the surface of the filler particles, a coupling agent is dissolved in a suitable solvent, such as acetone, and the solution blended with the filler. A minimum of solvent is used, as it must be removed once the filler particles have been coated.

In accordance with a preferred embodiment of my invention, the coupling agent is chemically bonded to the subject mineral filler. This is accomplished by heating the solvent-free, coated filler to a temperature in the range of from 150° to 220° C. for a period up to 60 minutes. This chemically reacts the A group on the coupling agent with the reactive hydroxyl functionalities on the surface of the filler. This chemical bond is typically formed by a condensation reaction.

The coated filler is then blended with a polyamide resin in particulate form and this mixture is then extruded and chopped to form a thermoplastic molding grade resin. Typically, from about 5 to 220 parts by weight of filler per 100 parts of polyamide resin are employed. In the final molding composition the coated filler is hydrogen bonded to the amide group on the polyamide matrix through one of the subject coupling compounds. These bonds which complete the chemical chain between the nylon polymer and the mineral filler are formed during the high temperature extrusion process.

The effectiveness of the subject coupling agents in a filled and reinforced polyamide composition can be seen in Table I which lists the tensile strength of (a) the non-filled nylon 6 (polycaprolactam), (b) a filled composition which contains no coupling agents, (c) a filled and reinforced composition which employs an organosilane coupling agent, and (d) several filled and reinforced compositions which employ one of the subject coupling agents. For this comparison, the same polyamide resin was used in each example. The type and amount of silica filler was also the same in each filled sample. Furthermore, the compositions containing the coupling agents were prepared in accordance with the respective preferred procedures.

TABLE 1

| Composition | Tensile Strength (psi) |
| --- | --- |
| 1. Nylon 6 (virgin) | 9,500 – 11,700 |
| 2. Nylon 6 + 40% silica (no coupling agent) | 8,800 |
| 3. Nylon 6 + 40% silica (with an organosilane coupling agent) | 12,109 |
| 4. Nylon 6 + 40% silica coupled with p-hydroxybenzyl alcohol | 11,490 |
| 5. Nylon 6 + 40% silica coupled with p-aminobenzyl alcohol | 10,200 |
| 6. Nylon 6 + 40% silica coupled with p-hydroxybenzoic acid | 10,800 |
| 7. Nylon 6 + 40% silica coupled with p-aminobenzoic acid | 10,600 |

These and other objects and advantages of my invention will be better understood in view of the detailed description thereof to include specific examples.

DETAILED DESCRIPTION OF THE INVENTION

The coupling mechanism, which binds the filler to the resin in the subject reinforced polyamide compositions, depends on the creation of two separate chemical bonds — one between the mineral filler and the coupling agent and the second between the coupling agent and the polyamide matrix. A condensation reaction between the A groups of the coupling agent molecules and the hydroxyl groups on the surface of the filler forms the chemical bond between the filler and the coupling agent. Typically, this reaction occurs at a temperature above 150° C. The chemical bond between the coupling agent and the polyamide matrix is believed to be a hydrogen bond between the polar B groups on the coupling agent and the amide groups on the polymer matrix. These hydrogen bonds are typically formed during the extrusion process.

The efforts which produced this invention were directed by the above theory which is included herein to orient the reader; however, it is to be emphasized that the scope of this invention is not to be limited by this theory.

Suitable mineral fillers for this application are those having reactive hydroxy groups on their surfaces. Such groups are typically present in silica and silicate type minerals. By reactive groups, it is meant to include those hydroxyl groups on the surface of a mineral filler which are capable of forming compounds such as (a) esters, if reacted with organic acids, (b) ethers, if reacted with alcohols, such as glycerol, (c) carbamates, reacted with isocyanates, or (d) a silane derivative, reacted with methyl trichlorosilane.

A variety of fillers having the reactive surface hydroxyl groups can be effectively coupled to a polyamide matrix by the subject coupling agents. For example, mica, wollastonite (CaSiO$_3$) and glass beads are suitable filler materials. In addition, it is to be understood that other minerals may be chemically pretreated in such a manner as to create these reactive surface hydroxyl groups and are therefore to be considered within the scope of this invention.

In accordance with the subject invention particulate fillers are preferred, especially if relatively large filler concentrations are used. However, it is to be understood that the coupling mechanism disclosed herein is not dependent on any particular particle shape and, therefore, the scope of this patent is not to be so limited.

A suitable filler particle size for the practice of this invention may vary over the range of from 0.1 micron to 400 microns. The major limitations on the particle size and shape are imposed by processing requirements. The subject coupling agents are effective over the entire particle size range that is feasible to use in an extrusion or molding grade polyamide resin. Similarly, if fibers are used as the reinforcing filler, the shape and size are again controlled by the processing requirements.

The polyamide polymers which can be effectively coupled to a mineral filler, in accordance with this invention, are those synthetic high molecular weight materials produced by either ring opening or condensation polymerization processes, which have amide groups in either a pendant position or incorporated directly into the polymer chain. Typically, polyamides are formed by the condensation of a diacid and a diamine, such as adipic acid and hexamethylene diamine in the case of nylon 66.

In accordance with this invention, the mineral filler may be chemically bound to the polyamide matrix by from 0.1% to 5% by weight, based on the filler, of a suitable coupling agent selected from the group of compounds described by the following structural formulae:

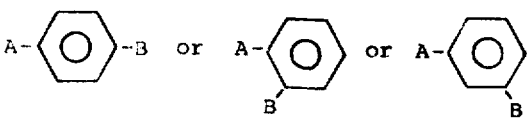

wherein the A segment is either a carboxyl (—COOH) or a methylene hydroxyl (—CH$_2$OH), and the B segment is either a hydroxyl (—OH) or an amine (—NH$_2$). Typical examples include p-hydroxybenzyl alcohol, p-hydroxybenzoic acid, and p-aminobenzyl alcohol.

EXAMPLE 1

The filler used in this and the following examples was a particulate silica marketed by the Malvern Mineral Company under the name "Novacite". The average particle size was in the range of 4 to 10 microns. Nylon 6 (polycaprolactam) was the specific polyamide resin used in this and the following examples. The particular resin was marketed by Allied Chemical under the trade designation "Plaskon 8200HS".

The initial step in preparing the subject filled and reinforced polyamide molding compositions was to thoroughly dry the silica filler. This was done by heating the filler to about 180° C. and holding it at that temperature overnight. This precautionary step was taken to eliminate the possibility of water or other volatile materials distorting the experimental results. This may not be necessary in production.

The next step was to uniformly coat 100 parts by weight of the filler with 0.7 part by weight of p-hydroxybenzyl alcohol. To insure the uniform distribution of the subject coupling agent over the surface of the filler, the coupling agent was initially dissolved or dispersed in about 5% by weight, based on the filler, of acetone. The acetone served both as a wetting agent and as a diluent. After this coating operation the acetone was evaporated.

To chemically bond the coupling agent to the underlying filler, it was cured at 170° C. for 45 minutes. The additional heat was necessary to drive the condensation reaction between the reactive hydroxyl groups on the filler and the hydroxyl groups on the A segment of the coupling.

After the filler has been combined with the coupling agent, 40 parts by weight of the coated filler is blended with 60 parts by weight of the subject polyamide resin. The initial mixing was carried out in a Henschel mixer and this was followed by two passes through a Sterling extruder having a single stage screw with an L/D ratio of 30:1. The melt temperature was about 265° C. at the screen pack; this may vary from 250° C. to 330° C. Subsequently, the extrudate was granulated into a molding composition and ASTM test samples were injection molded for the evaluation of the composition's physical properties. The tensile strength was measured on an Instron tester according to ASTM D-638. All samples were tested in a "dry as molded" condition. The tensile strengths of the filled compositions prepared in accordance with the procedures detailed in the above example and coupled with p-hydroxybenzyl alcohol and other members of the subject class of coupling agents are listed in Table I.

While my invention has been described in terms of certain specific examples, it will be appreciated that other forms thereof could readily be adopted by one skilled in the art. Therefore, the scope of my invention is not to be limited to the specific embodiments illustrated.

What is claimed is:

1. A filled and reinforced polyamide molding composition, in which a mineral filler is chemically coupled to said polyamide, comprising, by weight, 100 parts of a polyamide resin and from 5 to 220 parts of a finely divided mineral filler uniformly dispersed throughout said resin, the surfaces of said filler particles having reactive hydroxyl functionalities, wherein said composition the particles of said filler are coated with and chemically coupled to said polyamide by from 0.1% to about 5% by weight, based on said filler, of an aromatic coupling agent selected from the group consisting of those compounds described by the following formulae:

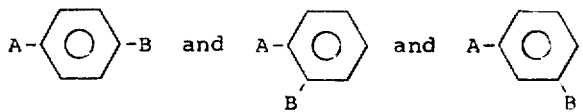

wherein said A group is a carboxyl functionality (—COOH), and said B group is selected from the group consisting of a hydroxyl functionality (—OH) and an amine functionality (—NH₂) wherein said composition the chemical bond between said coupling agent and said polyamide matrix is a hydrogen bond.

2. A filled and reinforced polycaprolactam molding composition, in which a mineral filler is chemically coupled to said polycaprolactam, comprising, by weight, 100 parts of a polycaprolactam resin and from 20 to 200 parts of a finely divided mineral filler dispersed therethrough, the surfaces of said filler having reactive hydroxyl functionalities, wherein said composition the particles of said filler are chemically coupled to said polycaprolactam by from about 0.1% to about 5% by weight, based on said filler, of an aromatic coupling agent selected from the group consisting of p-hydroxybenzoic acid and p-aminobenzoic acid wherein said composition the chemical bond between said coupling agent and said polyamide matrix is a hydrogen bond.

3. A method of forming a filled and reinforced polyamide molding composition, in which the filler is chemically coupled to the polyamide matrix, comprising:
   a. providing 100 parts by weight of a polyamide resin,
   b. providing from 5 to 220 parts by weight of a finely divided mineral filler having reactive hydroxyl functionalities on its surface,
   c. uniformly coating said filler with from 0.1% to 5% by weight, based on said filler, of a coupling agent selected from the group consisting of p-hydroxybenzoic acid and p-aminobenzoic acid,
   d. baking said coated filler at a temperature in the range of 150° C. to 220° C. for a time up to 60 minutes to chemically combined said coupling agent with said reactive hydroxyl functionalities on the surface of said filler,
   e. thoroughly blending said resin and said coated filler,
   f. extruding the resulting blend to temporarily melt said resin and uniformly disperse said coated filler throughout said polyamide resin, and thereby forming a hydrogen bond between said coupling agent and said polyamide resin, and
   g. chopping the resulting extrudate into particles to form a filled and reinforced thermoplastic molding composition.

4. A filled and reinforced polycaprolactam molding composition, in which a mineral filler is chemically coupled to said polycaprolactam, comprising, by weight, 100 parts of a polycaprolactam resin and from 20 to 200 parts of a finely divided mineral filler dispersed therethrough, the surfaces of said filler having reactive hydroxyl functionalities, wherein said composition the particles of said filler are chemically coupled to said polycaprolactam by from about 0.1% to about 5% by weight, based on said filler, of p-aminobenzoic acid wherein said composition the chemical bond between said coupling agent and said polyamide matrix is a hydrogen bond.

* * * * *